US012595879B1

(12) United States Patent
Lu

(10) Patent No.: US 12,595,879 B1
(45) Date of Patent: Apr. 7, 2026

(54) HOLE-FREE CURTAIN INSTALLATION STRUCTURE AND CURTAIN

(71) Applicant: Ningbo Zhenfei Decorated Curtain Co., Ltd., Yuyao (CN)

(72) Inventor: Jiefei Lu, Yuyao (CN)

(73) Assignee: Ningbo Zhenfei Decorated Curtain Co., Ltd., Yuyao (CN)

( * ) Notice: Subject to any disclaimer, the term of this patent is extended or adjusted under 35 U.S.C. 154(b) by 0 days.

(21) Appl. No.: 19/375,252

(22) Filed: Oct. 31, 2025

(30) Foreign Application Priority Data

Oct. 10, 2025 (CN) .......................... 202522146609.6

(51) Int. Cl.
 *F16M 13/02* (2006.01)
 *E06B 9/262* (2006.01)
(52) U.S. Cl.
 CPC ............. *F16M 13/02* (2013.01); *E06B 9/262* (2013.01)
(58) Field of Classification Search
 CPC ........ A47H 1/122; A47H 1/022; A47H 1/102; A47H 1/142; F16M 13/02
 USPC ....... 248/261, 262, 264, 265, 544, 251, 252, 248/254, 257
 See application file for complete search history.

(56) References Cited

U.S. PATENT DOCUMENTS

| | | | | |
|---|---|---|---|---|
| 4,416,561 A | * | 11/1983 | Fischer ................... | B25B 13/50 248/231.91 |
| 4,848,432 A | * | 7/1989 | Connolly ................ | E06B 9/323 403/44 |
| 7,549,615 B2 | * | 6/2009 | Shevick .................. | E06B 9/323 248/200.1 |
| 8,122,932 B2 | * | 2/2012 | Cannaverde .............. | E06B 9/50 248/265 |
| 10,538,962 B2 | * | 1/2020 | Hall ......................... | E06B 9/323 |
| 11,246,444 B2 | * | 2/2022 | Tan ........................... | E06B 9/42 |
| 11,766,149 B2 | * | 9/2023 | Sisto ........................ | A47K 3/38 248/262 |
| 2020/0305628 A1 | * | 10/2020 | Tan .......................... | A47H 1/14 |
| 2021/0315406 A1 | * | 10/2021 | Jiang ...................... | A47H 1/022 |

* cited by examiner

*Primary Examiner* — Terrell L McKinnon
*Assistant Examiner* — Michael McDuffie

(57) ABSTRACT

Disclosed are a hole-free curtain installation structure and a curtain, relating to the technical field of curtains. The structure includes an upper beam bracket and two installation frame assemblies. The installation frame assemblies are symmetrically arranged at both ends of the upper beam bracket, respectively. The installation frame assembly includes a housing and a sliding frame component slidably arranged on the housing in a horizontal direction. The housing is provided with an adjusting mechanism for adjusting a sliding position of the sliding frame component. The position of the sliding frame component is adjusted by the adjusting mechanism, so that the sliding frame component is abutted against a wall for fixation, eliminating the need for drilling holes in the wall, enhancing the convenience of installation, and preserving the integrity of the wall.

18 Claims, 7 Drawing Sheets

HOLE-FREE CURTAIN INSTALLATION STRUCTURE AND CURTAIN

CROSS REFERENCE TO RELATED APPLICATIONS

The present application claims the benefit of Chinese Patent Application No. 2025221466096 filed on Oct. 10, 2025, the contents of which are incorporated herein by reference in their entirety.

TECHNICAL FIELD

The disclosure herein relates to the technical field of curtains, in particular to a hole-free curtain installation structure and a curtain.

BACKGROUND

An accordion curtain, also known as a honeycomb curtain, is a household decorative curtain adopting a honeycomb-like hollow structure, named for folds resembling an accordion. The curtain is designed to store air to achieve a constant temperature function, and has heat insulation, sound insulation, ultraviolet resistance, and anti-static properties. This type of curtain was mainly manually operated in the early stage, and later developed into full-shading curtains, semi-shading curtains, and electric curtains. The full-shading curtains, made of airtight fabric, are suitable for private spaces such as bedrooms. The semi-shading curtains balance lighting and decoration, and are commonly used in bathrooms and dining rooms.

For some existing curtain products such as honeycomb curtains, holes need to be drilled in a wall, and then upper beam brackets of the curtains need to be fixed with parts such as bolts. The drilling operation is troublesome, the installation is time-consuming and labor-intensive, and bolt holes will be left in the wall, which damages the wall and affects the integrity of the wall.

SUMMARY

To resolve at least one of the foregoing problems, the disclosure herein provides a hole-free curtain installation structure, including an upper beam bracket and two installation frame assemblies. The installation frame assemblies are symmetrically arranged at both ends of the upper beam bracket, respectively. The installation frame assembly includes a housing and a sliding frame component slidably arranged on the housing in a horizontal direction. The housing is provided with an adjusting mechanism for adjusting a sliding position of the sliding frame component. The adjusting mechanism includes a rotating member, an output gear, and a transmission component connected between the rotating member and the output gear. The sliding frame component is provided with a rack meshing with the output gear. The rotating member is capable of rotating in a circumferential direction thereof and sliding in an axial direction thereof. A first compression spring is abutted between the output gear and the rotating member. The rotating member is provided with a positioning protrusion. The housing is provided with a positioning groove corresponding to the positioning protrusion.

During installation, an external force drives the rotating member to slide axially, so that the positioning protrusion is separated from the positioning groove. The external force drives the rotating member to rotate circumferentially, and the rotating member drives the output gear to rotate through the transmission component. The output gear drives the sliding frame component to slide toward an external wall through the rack until the sliding frame component is abutted against the wall. When the external force is released from the rotating member, the rotating member slides and resets under an elastic force of the first compression spring, so that the positioning protrusion is engaged and positioned with the positioning groove to maintain an abutting force of the sliding frame component against the wall. By means of the hole-free curtain installation structure according to the disclosure herein, the position of the sliding frame component is adjusted by the adjusting mechanism, so that the sliding frame component is abutted against a wall for fixation, eliminating the need for drilling holes in the wall, enhancing the convenience of installation, and preserving the integrity of the wall.

Optionally, the rack extends in the horizontal direction. The sliding frame component includes a main frame body and a telescopic frame slidably arranged on the main frame body in the horizontal direction. The telescopic frame is arranged at the end of the main frame body close to the wall. A second compression spring is abutted between the telescopic frame and the main frame body. An anti-skid pad is arranged on the side of the telescopic frame away from the main frame body.

Optionally, the telescopic frame is provided with a buckle. The main frame body is provided with a limit clamping groove corresponding to the buckle. The buckle is slidably arranged in the limit clamping groove in the horizontal direction. The main frame body is provided with a first abutting portion. The telescopic frame is provided with a second abutting portion corresponding to the first abutting portion.

Optionally, the transmission component includes a transmission gear. The transmission gear includes a first transmission gear and a second transmission gear that are integrally formed. The first transmission gear and the second transmission gear are coaxially arranged. The rotating member is integrally provided with a first gear portion meshing with the first transmission gear. The output gear is integrally provided with a second gear portion meshing with the second transmission gear. The output gear and the second gear portion are coaxially arranged.

Optionally, the diameter of the first gear portion is smaller than that of the first transmission gear. The diameter of the first transmission gear is larger than that of the second transmission gear. The diameter of the second gear portion is larger than that of the second transmission gear. The diameter of the second gear portion is larger than that of the output gear.

Optionally, a plurality of positioning protrusions are equally spaced in a ring. A plurality of positioning grooves are equally spaced in a ring. The number of positioning protrusions is the same as that of positioning grooves.

Optionally, both sides of the positioning protrusion are provided with first guide slopes. Both sides of a notch of the positioning groove are provided with second guide slopes corresponding to the first guide slopes.

Optionally, the housing is provided with an installation shaft. The output gear is rotatably sleeved on the installation shaft. The first compression spring is sleeved on the installation shaft. The sliding frame component is provided with a sliding groove. The installation shaft is in sliding fit with the sliding groove.

Optionally, the hole-free curtain installation structure further includes a rotating handle for driving the rotating member to rotate. The rotating member is provided with an insertion groove. The rotating handle includes a rotating shaft and a handle rotatably sleeved on the rotating shaft. The rotating shaft is convexly provided with an arc-shaped positioning portion. The handle is circumferentially provided with a plurality of positioning recesses adapted to be movably engaged with the arc-shaped positioning portion. The rotating shaft is provided with an insertion column detachably inserted into the insertion groove. The shape of the insertion column is adapted to that of the insertion groove. When the insertion column is inserted into the insertion groove, an external force pushes the handle axially, and the handle drives the rotating member to slide axially through the rotating shaft, so that the positioning protrusion is separated from the positioning groove. In this case, the external force rotates the handle circumferentially to drive the rotating member to rotate synchronously. When the handle is rotated, the rotating shaft has resistance to the handle in a circumferential direction. When the resistance exceeds a preset value, the handle idles relative to the rotating shaft.

Compared with the prior art, the hole-free curtain installation structure in the disclosure herein adjusts the position of the sliding frame component by the adjusting mechanism, so that the sliding frame component is abutted against a wall for fixation, eliminating the need for drilling holes in the wall, enhancing the convenience of installation, and preserving the integrity of the wall. The hole-free curtain installation structure also includes a rotating handle for driving the rotating member to rotate. As an extension rod for an arm of force, the rotating handle significantly increases a rotation radius for a user's operation, making the operation more labor-saving and convenient. After the installation is completed, the user can easily pull the rotating handle out of the rotating member without affecting the appearance of the curtain.

In addition, the disclosure herein also provides a curtain, including the foregoing hole-free curtain installation structure. The curtain also has the beneficial effects of the foregoing hole-free curtain installation structure. Details are not described herein again.

Figure 1:
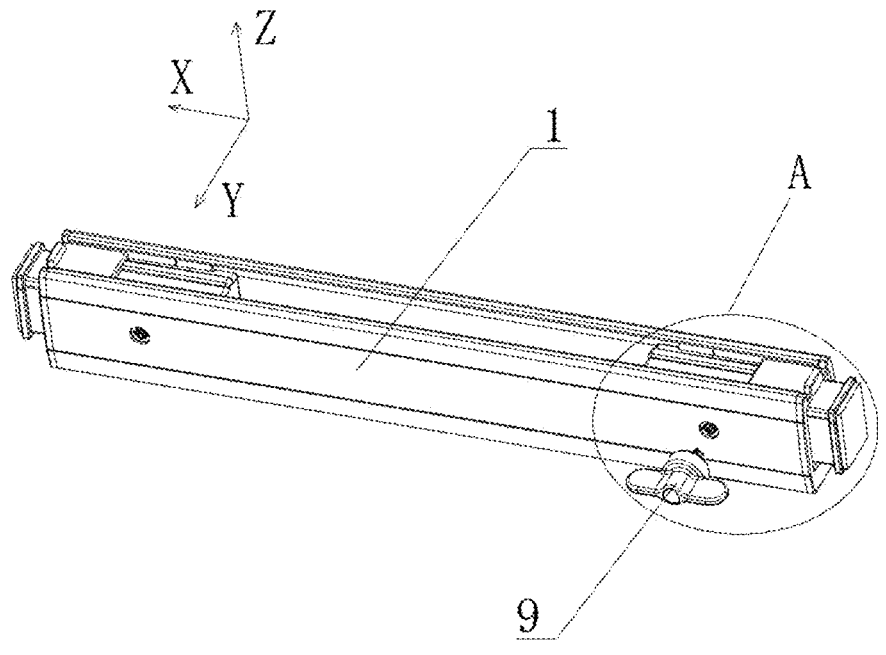
FIG. 1 is a perspective view of a hole-free curtain installation structure according to the disclosure herein before installation.

Components corresponding to reference numerals in the figures: 1: upper beam bracket, 2: installation frame assembly, 3: housing, 301: positioning groove, 3011: second guide slope, 31: installation shaft, 4: sliding frame component, 401: rack, 402: sliding groove, 41: main frame body, 411: limit clamping groove, 412: first abutting portion, 42: telescopic frame, 421: buckle, 422: second abutting portion, 43: second compression spring, 44: anti-skid pad, 5: rotating member, 51: first gear portion, 501: positioning protrusion, 5011: first guide slope, 502: insertion groove, 6: output gear, 61: second gear portion, 7: first compression spring, 8: transmission gear, 81: first transmission gear, 82: second transmission gear, 9: rotating handle, 901: insertion column, 91: rotating shaft, 911: arc-shaped positioning portion, 912: annular wall, 92: handle, 921: positioning recess, and 10: wall.

DETAILED DESCRIPTION

To make the foregoing objectives, features, and advantages of the disclosure herein more obvious and understandable, specific examples of the disclosure herein will be described in detail below in conjunction with the accompanying drawings.

In the description of the disclosure herein, it should be understood that orientations or positional relationships indicated by terms such as "upper" and "lower" are based on orientations or positional relationships when a product is in normal use.

The terms "first" and "second" are only used for descriptive purposes, and should not be understood as indicating or implying relative importance or implicitly specifying the number of the indicated technical features. Therefore, the features defined with "first" and "second" may explicitly or implicitly include at least one such feature.

Referring to FIG. 1 to FIG. 13, an example of the disclosure herein provides a hole-free curtain installation structure, including an upper beam bracket 1 and two installation frame assemblies 2. The installation frame assemblies 2 are symmetrically arranged at both ends of the upper beam bracket 1, respectively. The installation frame assembly 2 includes a housing 3 and a sliding frame component 4 slidably arranged on the housing 3 in a horizontal direction. The housing 3 is provided with an adjusting mechanism for adjusting a sliding position of the sliding frame component 4. The adjusting mechanism includes a rotating member 5, an output gear 6, and a transmission component connected between the rotating member 5 and the output gear 6. The sliding frame component 4 is provided with a rack 401 meshing with the output gear 6. The rotating member 5 is capable of rotating in a circumferential direction thereof and sliding in an axial direction thereof. A first compression spring 7 is abutted between the output gear 6 and the rotating member 5. The rotating member 5 is provided with a positioning protrusion 501. The housing 3 is provided with a positioning groove 301 corresponding to the positioning protrusion 501.

During installation, the upper beam bracket 1 is first arranged inside a window frame. Taking the installation frame assembly 2 at one end (a right end) as an example, an external force drives the rotating member 5 at this end to slide axially, so that the positioning protrusion 501 is sepa-rated from the positioning groove 301. The external force drives the rotating member 5 to rotate circumferentially, and the rotating member 5 drives the output gear 6 to rotate through the transmission component. The output gear 6 drives the sliding frame component 4 to slide toward an external wall 10 through the rack 401 until the sliding frame component 4 is abutted against the wall 10. When the external force is released from the rotating member 5, the rotating member 5 slides and resets under an elastic force of the first compression spring 7, so that the positioning pro-trusion 501 is engaged and positioned with the positioning groove 301 to maintain an abutting force of the sliding frame component 4 at this end against the wall 10. The installation principle of the installation frame assembly 2 at the other end is the same as above. When the sliding frame component 4 at a left end is abutted against a left wall and the sliding frame component 4 at the right end is abutted against a right wall, the upper beam bracket 1 is fixedly installed inside the window frame, and curtain installation is completed. By means of the hole-free curtain installation structure accord-ing to the disclosure herein, the position of the sliding frame component is adjusted by the adjusting mechanism, so that the sliding frame component is abutted against a wall for fixation, eliminating the need for drilling holes in the wall, enhancing the convenience of installation, and preserving the integrity of the wall.

Figure 3:
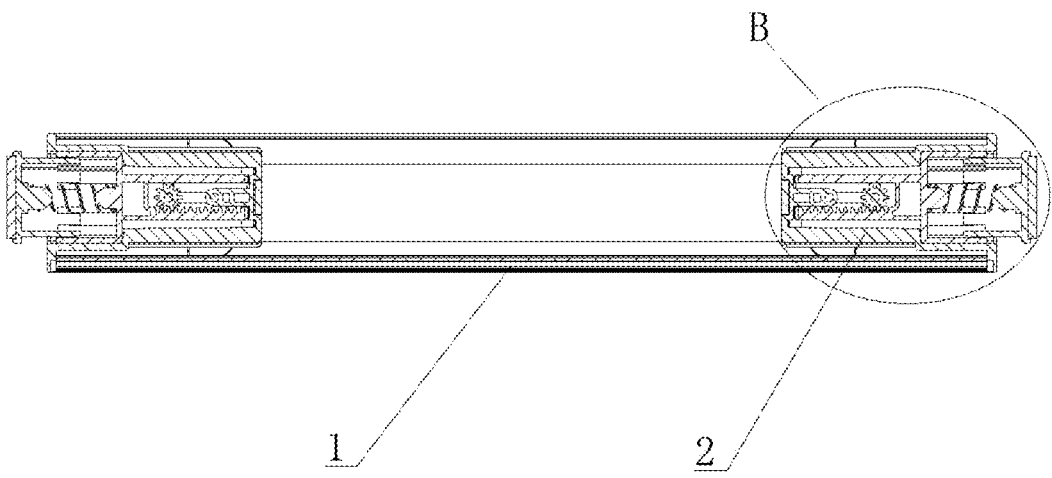
FIG. 3 is a cross-sectional view of a hole-free curtain installation structure according to the disclosure herein before installation.
Figure 4:
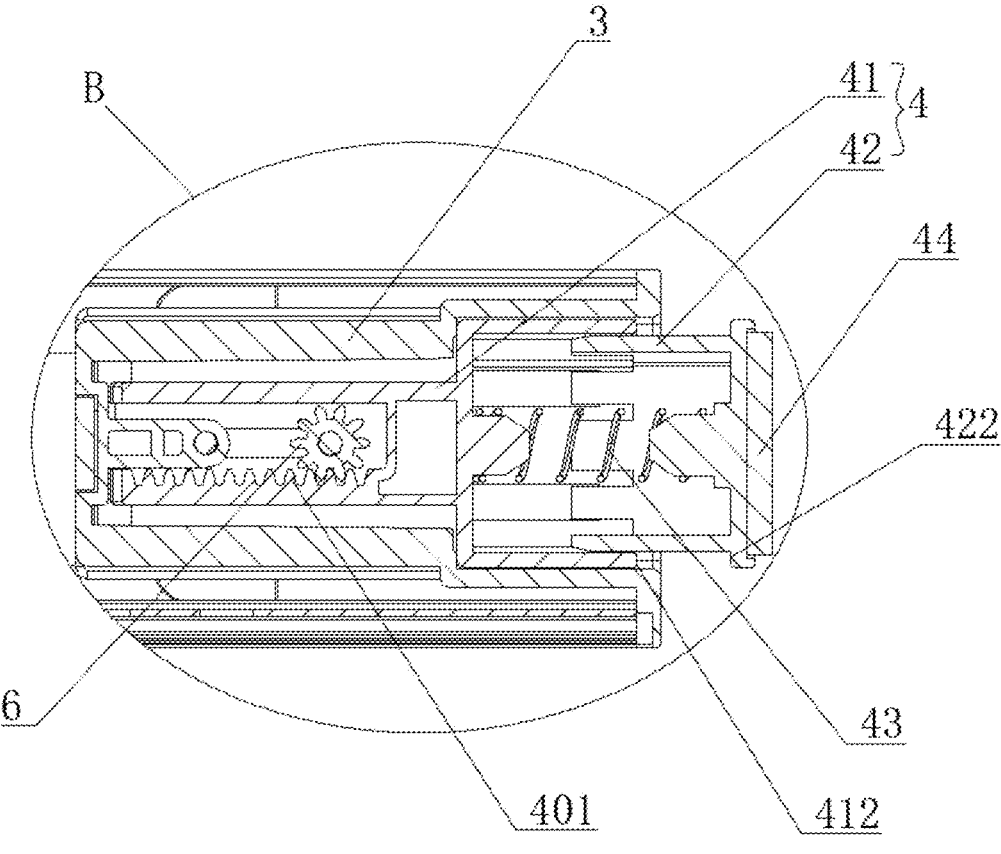
FIG. 4 is an enlarged view of part B in FIG. 3.
Figure 5:
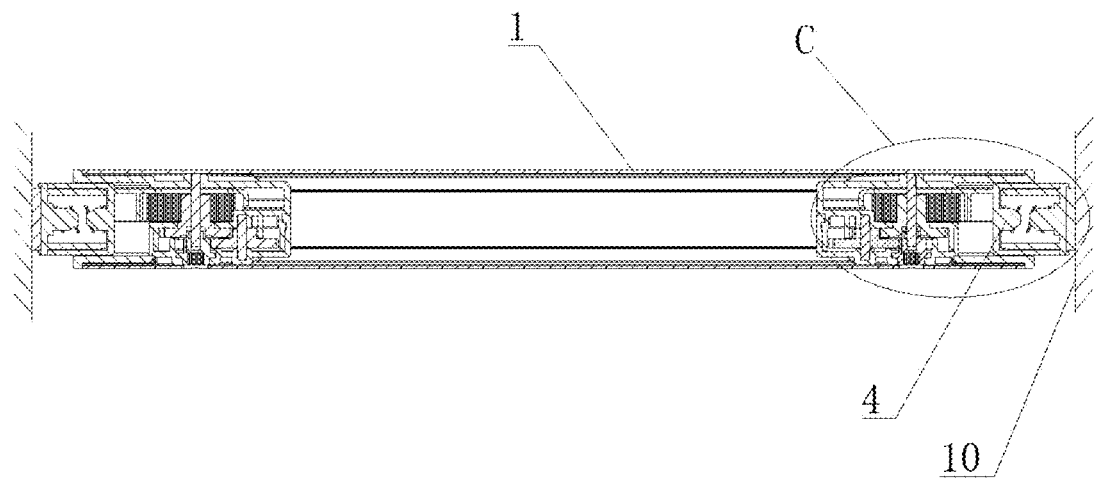
FIG. 5 is a cross-sectional view of a hole-free curtain installation structure according to the disclosure herein after installation.
Figure 8:
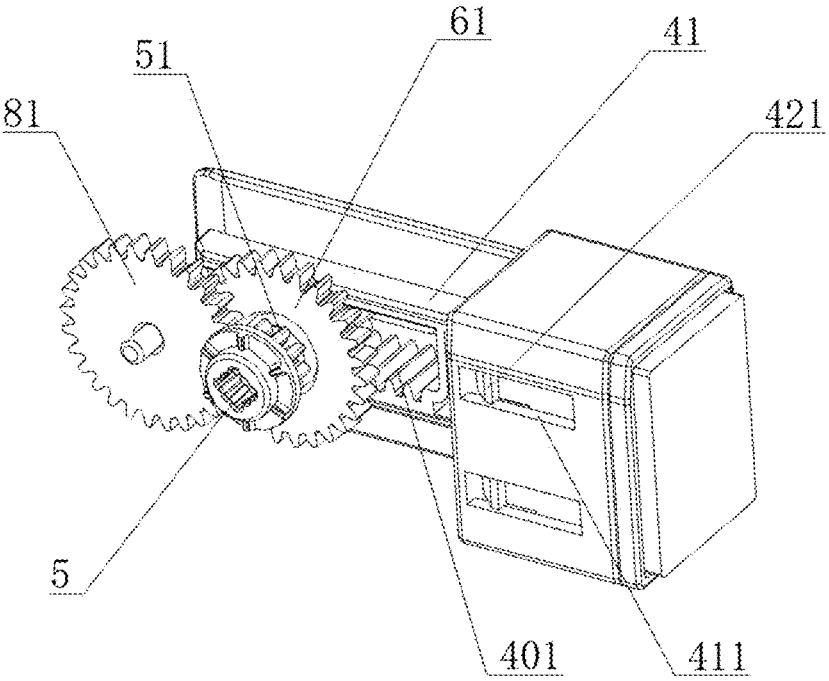
FIG. 8 is a structural schematic diagram of a transmission component part of a hole-free curtain installation structure according to the disclosure herein.

Referring to FIG. 3, FIG. 4, and FIG. 8, the rack 401 extends in the horizontal direction. The sliding frame com-ponent 4 includes a main frame body 41 and a telescopic frame 42 slidably arranged on the main frame body 41 in the horizontal direction. The telescopic frame 42 is arranged at the end of the main frame body 41 close to the wall 10. A second compression spring 43 is abutted between the tele-scopic frame 42 and the main frame body 41. An anti-skid pad 44 is arranged on the side of the telescopic frame 42 away from the main frame body 41. A pre-installation function for a curtain is achieved by the telescopic frame 42.

The pre-installation steps in this example are as follows: In a state before installation, the telescopic frame 42 is in an extended state. In this case, the telescopic frames 42 at both ends are compressed inward, so that the entire upper beam bracket 1 can be installed into the window frame. In this case, the second compression spring 43 drives the telescopic frame 42 to extend and abut against the wall 10 on the same side, and the anti-slid pad 44 on the telescopic frame 42 contacts the wall to achieve an anti-slid effect. At this point, the upper beam bracket 1 is pre-installed in the window frame, temporarily supporting the weight of the entire cur-tain to prevent the curtain from falling, and realizing "air hovering" during single-person operation, which greatly simplifies the installation procedure for subsequent instal-lation steps. It should be noted that after pre-installation, the telescopic frame 42 is not fully abutted against the wall 10, and subsequent installation steps for full abutment are required: After completing the pre-installation, taking the installation frame assembly 2 at one end as an example, an external force drives the rotating member 5 at this end to slide axially, so that the positioning protrusion 501 is sepa-rated from the positioning groove 301. The external force drives the rotating member 5 to rotate circumferentially, and the rotating member 5 drives the output gear 6 to rotate through the transmission component. The output gear 6 drives the sliding frame component 4 to slide toward the external wall 10 through the rack 401 until the sliding frame component 4 is abutted against the wall 10. When the external force is released from the rotating member 5, the rotating member 5 slides and resets under an elastic force of the first compression spring 7, so that the positioning pro-trusion 501 is engaged and positioned with the positioning groove 301 to maintain an abutting force of the sliding frame component 4 at this end against the wall 10. The installation principle of the installation frame assembly 2 at the other end is the same as above. When the sliding frame component 4 at the left end is abutted against the left wall and the sliding frame component 4 at the right end is abutted against the right wall, the upper beam bracket 1 is fixedly installed inside the window frame, and the curtain installation is completed.

Referring to FIG. 3, FIG. 4, FIG. 6, and FIG. 8, the telescopic frame 42 is provided with a buckle 421. The main frame body 41 is provided with a limit clamping groove 411 corresponding to the buckle 421. The buckle 421 is slidably arranged in the limit clamping groove 411 in the horizontal direction. Through the cooperation between the buckle 421 and the limit clamping groove 411, the telescopic frame 42 is prevented from being completely separated from the main frame body 41 during installation, ensuring reliable use. The main frame body 41 is provided with a first abutting portion 412. The telescopic frame 42 is provided with a second abutting portion 422 corresponding to the first abutting portion 412. After the pre-installation, the rotating member 5 drives the main frame body 41 to move toward the wall, so that the first abutting portion 412 of the main frame body 41 is abutted against the second abutting portion 422. In this case, the rotating member 5 is continuously rotated, so that the main frame body 41 applies a thrust toward the wall to the telescopic frame 42, making the telescopic frame 42 fully abutted against the wall to complete the installation steps with a firm installation effect.

Referring to FIG. 5, FIG. 6, FIG. 8, and FIG. 9, the transmission component includes a transmission gear 8. The transmission gear 8 includes a first transmission gear 81 and a second transmission gear 82 that are integrally formed. The first transmission gear 81 and the second transmission gear 82 are coaxially arranged. The rotating member 5 is integrally provided with a first gear portion 51 meshing with the first transmission gear 81. The output gear 6 is integrally provided with a second gear portion 61 meshing with the second transmission gear 82. The output gear 6 and the second gear portion 61 are coaxially arranged. The gear structure is used for transmission, implementing a simple structure and reliable transmission. The diameter of the first gear portion 51 is smaller than that of the first transmission gear 81. The diameter of the first transmission gear 81 is larger than that of the second transmission gear 82. The diameter of the second gear portion 61 is larger than that of the second transmission gear 82. The diameter of the second gear portion 61 is larger than that of the output gear 6. Thus, the function of multi-stage gear deceleration is achieved, and the sliding and extending speed of the main frame body 41 is reduced to facilitate fine adjustment. Specifically, due to the significant deceleration of the main frame body 41, a user needs to rotate the rotating member 5 for many circles to make the main frame body 41 move outward by a small distance. This high transmission ratio allows the user to finely adjust the pressing tightness, and the user may extend the main frame body 41 slowly and precisely, thereby driving the telescopic frame to press against the wall until the abutting force is appropriate, and improving the success rate and quality of installation.

The transmission component of this example is suitable for a curtain product where the upper beam bracket 1 has a large vertical height (sufficient installation space in a vertical direction). When the upper beam bracket 1 of the curtain product has a small vertical height (limited installation space in the vertical direction) but a large length in a front-back direction, the number of gears may be increased in the front-back direction to achieve multi-stage deceleration transmission. Increasing the number of gears in the front-back direction helps reduce the diameter of each transmission gear to meet design requirements. Referring to FIG. 1, the vertical direction of the upper beam bracket 1 is a Z-axis direction, and the front-back direction of the upper beam bracket 1 is a Y-axis direction.

Referring to FIG. 6, FIG. 10, FIG. 11, and FIG. 12, a plurality of positioning protrusions 501 are equally spaced in a ring. A plurality of positioning grooves 301 are equally spaced in a ring. The number of positioning protrusions 501 is the same as that of positioning grooves 301. The cooperation between the plurality of positioning protrusions 501 and positioning grooves 301 enables a multi-point positioning function, improving adjustment accuracy. Meanwhile, the plurality of positioning protrusions 501 and positioning grooves 301 mesh at the same time to evenly distribute force received after locking to a plurality of contact points, to disperse stress, thereby preventing structural damage and prolonging the service life. Both sides of the positioning protrusion 501 are provided with first guide slopes 5011. Both sides of a notch of the positioning groove 301 are provided with second guide slopes 3011 corresponding to the first guide slopes 5011. During installation, the rotating member 5 is pushed axially to make the positioning protrusions 501 separated from the positioning grooves 301. When the external force is released from the rotating member 5, the cooperation between the first guide slopes 5011 and the second guide slopes 3011 allows the positioning protrusions 501 to smoothly fall back into the corresponding positioning grooves 301, enabling the rotating member 5 to reset smoothly under the action of the first compression spring 7 for locking.

Figure 6:
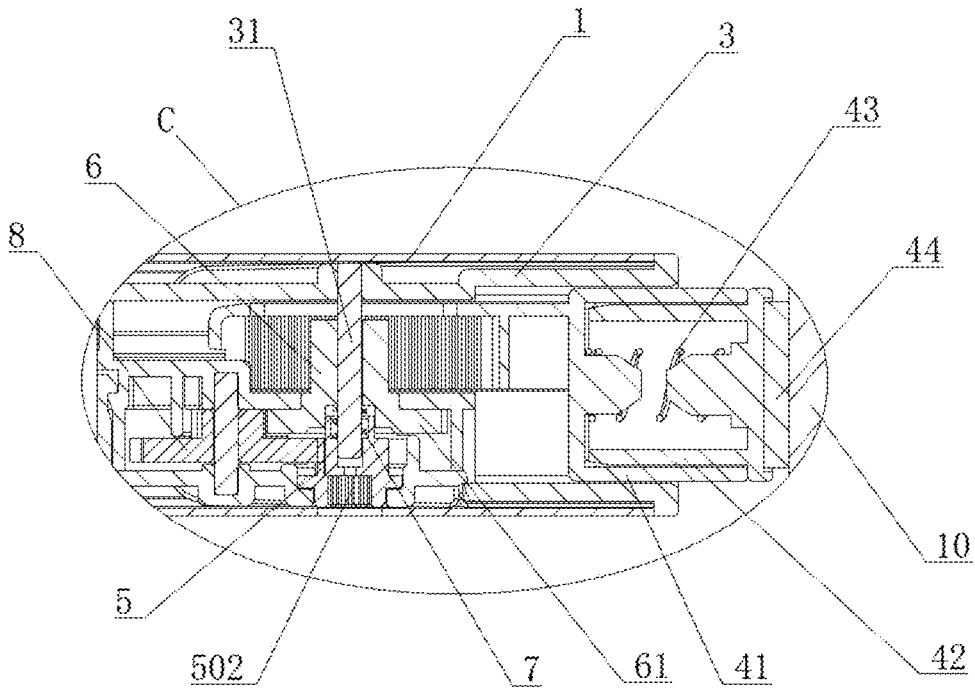
FIG. 6 is an enlarged view of part C in FIG. 5.
Figure 7:
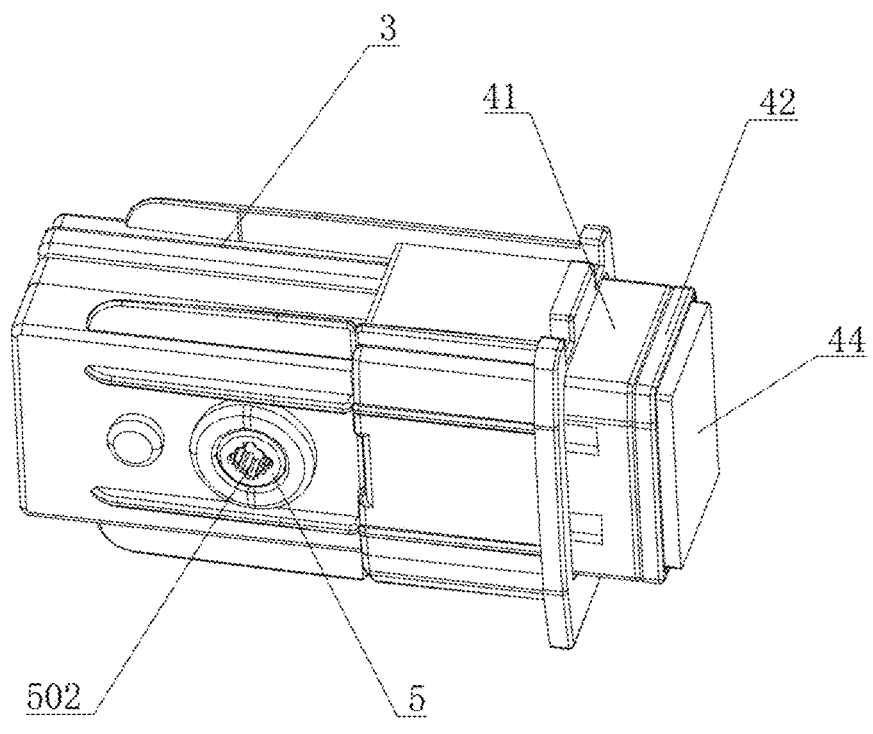
FIG. 7 is a structural schematic diagram of an installation frame assembly of a hole-free curtain installation structure according to the disclosure herein.
Figure 9:
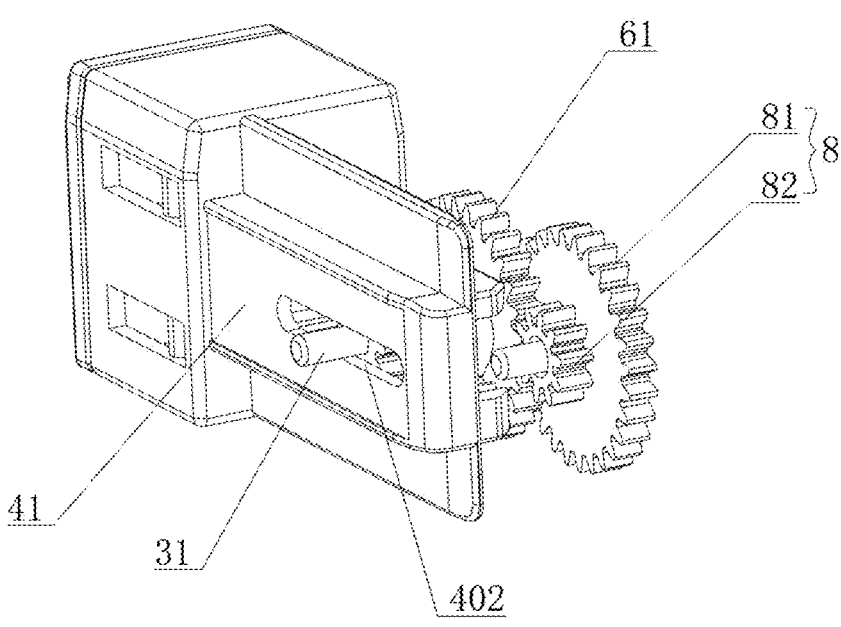
FIG. 9 is a structural schematic diagram of a sliding groove of a hole-free curtain installation structure according to the disclosure herein.
Figure 10:
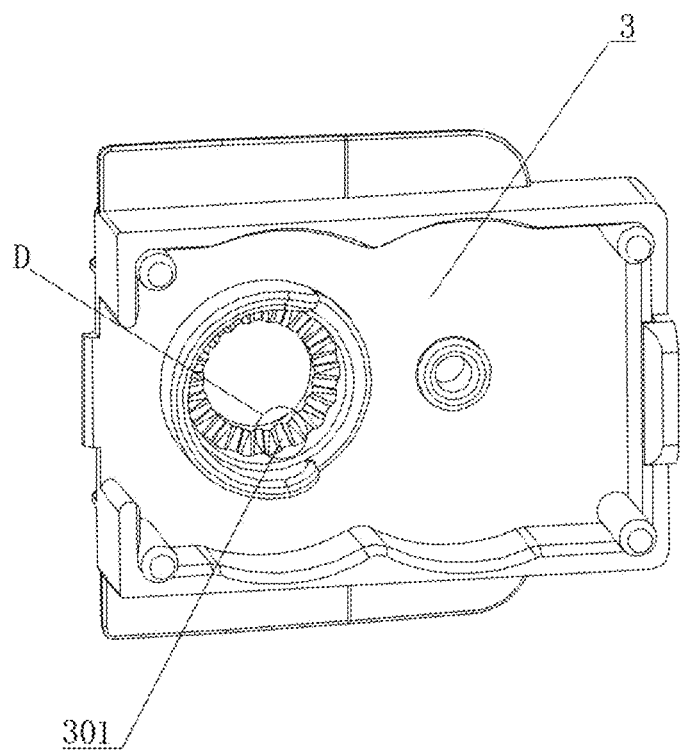
FIG. 10 is a structural schematic diagram of a housing of a hole-free curtain installation structure according to the disclosure herein.
Figure 11:
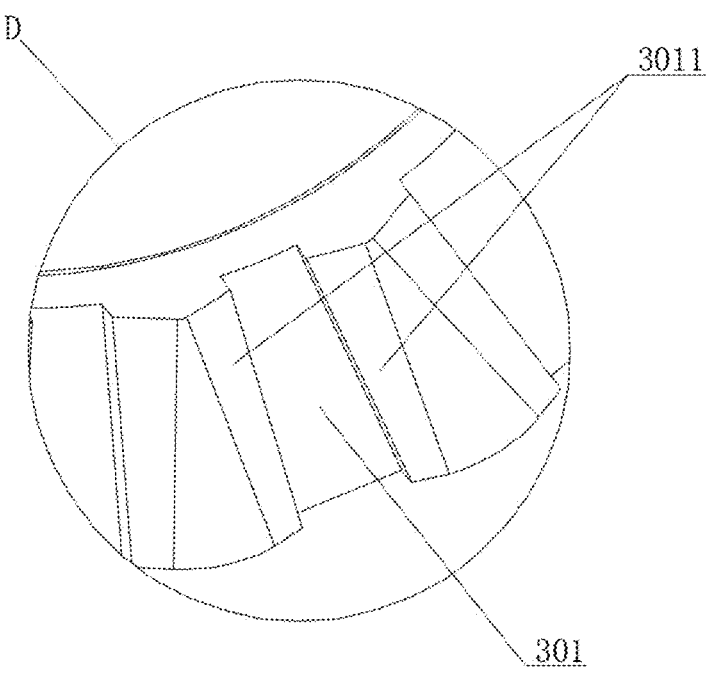
FIG. 11 is an enlarged view of part D in FIG. 10.
Figure 12:
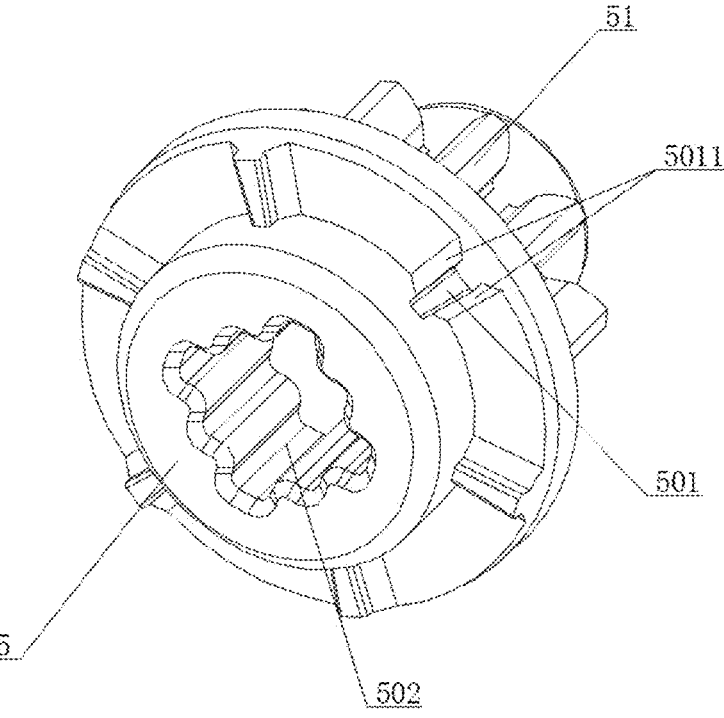
FIG. 12 is a structural schematic diagram of a rotating member of a hole-free curtain installation structure according to the disclosure herein.

Referring to FIG. 6 and FIG. 9, the housing 3 is provided with an installation shaft 31. The output gear 6 is rotatably sleeved on the installation shaft 31. The first compression spring 7 is sleeved on the installation shaft 31. The installation shaft 31 provides support for a rotational motion of the output gear 6, and also provides positioning for the first compression spring 7 during installation, thereby preventing the first compression spring 7 from shifting significantly, to ensure an accurate elastic force. The installation shaft 31 has multiple functions and a compact structure, and saves costs. The sliding frame component 4 is provided with a sliding groove 402. The installation shaft 31 is in sliding fit with the sliding groove 402, thereby avoiding interference between the sliding frame component 4 and the installation shaft 31 during sliding, and implementing a reasonable structural design.

Figure 2:
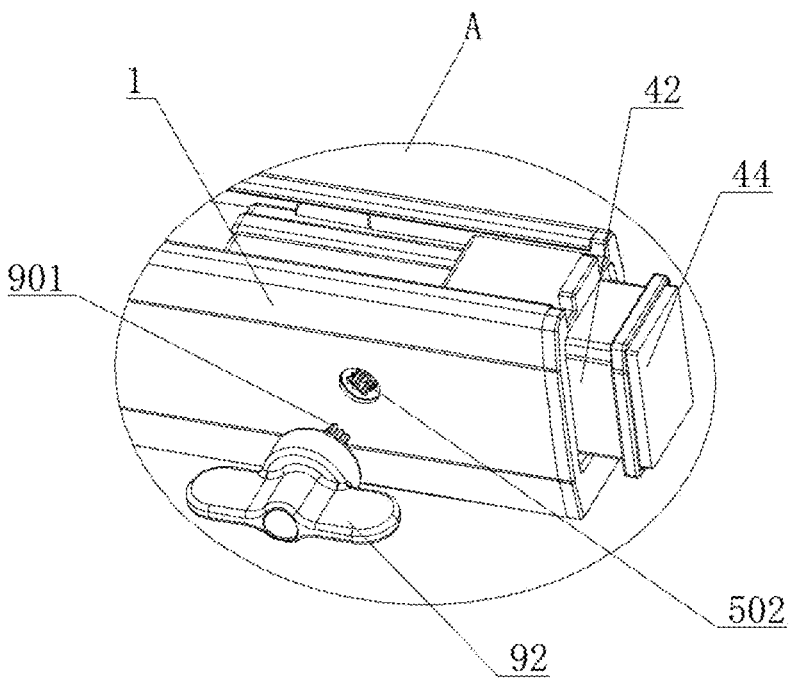
FIG. 2 is an enlarged view of part A in FIG. 1.
Figure 13:
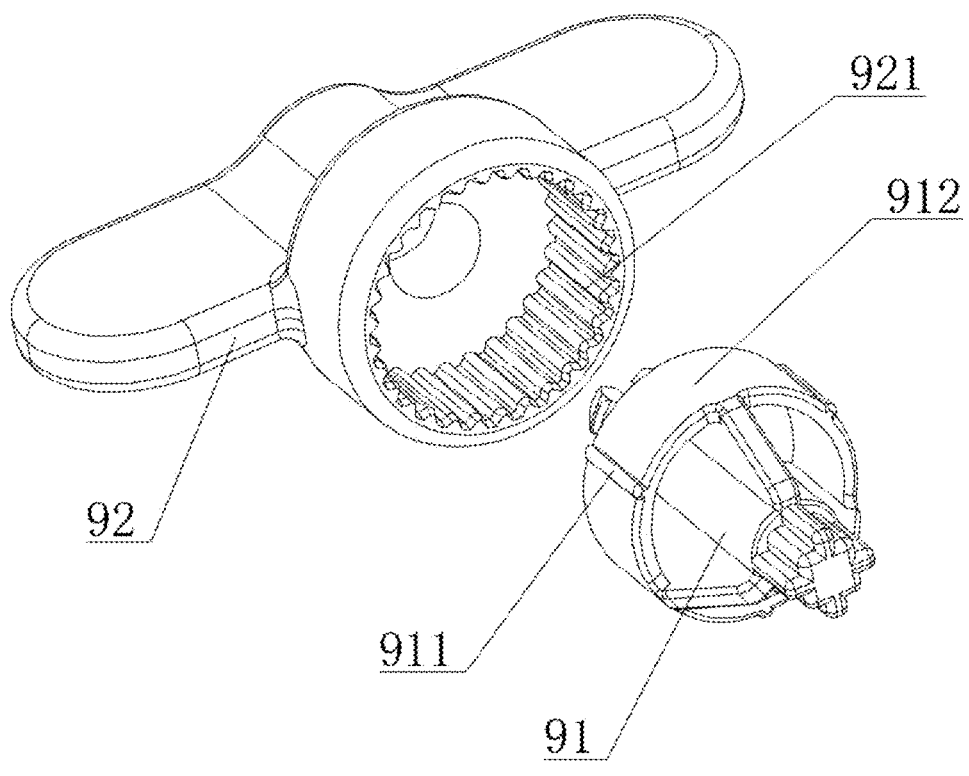
FIG. 13 is an exploded view of a rotating handle of a hole-free curtain installation structure according to the disclosure herein.

Referring to FIG. 1, FIG. 2 and FIG. 13, the hole-free curtain installation structure further includes a rotating handle 9 for driving the rotating member 5 to rotate. The rotating member 5 is provided with an insertion groove 502. The rotating handle 9 includes a rotating shaft 91 and a handle 92 rotatably sleeved on the rotating shaft 91. The rotating shaft 91 is convexly provided with an arc-shaped positioning portion 911. The handle 92 is circumferentially provided with a plurality of positioning recesses 921 adapted to be movably engaged with the arc-shaped positioning portion 911. The rotating shaft 91 is provided with an insertion column 901 detachably inserted into the insertion groove 502. The shape of the insertion column 901 is adapted to that of the insertion groove 502. When the insertion column 901 is inserted into the insertion groove 502, an external force pushes the handle 92 axially, and the handle 9 drives the rotating member 5 to slide axially through the rotating shaft 91, so that the positioning protrusion 501 is separated from the positioning groove 301. In this case, the external force rotates the handle 92 circumferentially to drive the rotating member 5 to rotate synchronously. When the handle 92 is rotated, the rotating shaft 91 has resistance to the handle 92 in a circumferential direction. When the resistance exceeds a preset value, the handle 92 idles relative to the rotating shaft 91, thereby preventing transmission parts such as the output gear 6 and the rack 401 from breaking or being damaged due to excessive rotational force applied by a user, and prolonging the service life. It should be noted that the preset value is a critical value at which the handle 92 idles relative to the rotating shaft 91. Under the preset value, the force on transmission parts such as the output gear 6 and the rack 401 remains within a safe range, preventing damage such as breakage. In this example, a plurality of arc-shaped positioning portions 911 are equally spaced in the circumferential direction. Specifically, three arc-shaped positioning portions 911 are arranged. The rotating shaft 91 is provided with an annular wall 912, and the arc-shaped positioning portions 911 are integrally formed on the outer side of the annular wall 912. During design, the magnitude of the preset value may be controlled by the thickness of the annular wall 912 and the protrusion height of the arc-shaped positioning portions 911. As the annular wall 912 is thicker, the protrusion height of the arc-shaped positioning portions 911 is higher, and the preset value is larger. Conversely, as the annular wall 912 is thinner, the protrusion height of the arc-shaped positioning portions 911 is lower, and the preset value is smaller. In this example, the handle 92 is rotatably inserted into the rotating shaft 91. As an extension rod for an arm of force, the rotating handle 9 significantly increases a rotation radius for a user's operation, making the operation more labor-saving and convenient. After the installation is completed, the user can easily pull the rotating handle 9 out of the rotating member 5 without affecting the appearance of the curtain.

The hole-free curtain installation structure in the disclosure herein adjusts the position of the sliding frame component by the adjusting mechanism, so that the sliding frame component is abutted against a wall for fixation, eliminating the need for drilling holes in the wall, enhancing the convenience of installation, and preserving the integrity of the wall. The hole-free curtain installation structure also includes a rotating handle for driving the rotating member to rotate. As an extension rod for an arm of force, the rotating handle significantly increases a rotation radius for a user's operation, making the operation more labor-saving and convenient. After the installation is completed, the user can easily pull the rotating handle out of the rotating member without affecting the appearance of the curtain.

In addition, the disclosure herein also provides a curtain, including the foregoing hole-free curtain installation structure. The curtain also has the beneficial effects of the foregoing hole-free curtain installation structure. Details are not described herein again.

In the description of the disclosure herein, it should be understood that orientations or positional relationships indicated by terms such as "upper", "lower", "bottom", "inner", "outer", and "circumferential" are based on the orientations or positional relationships shown in the accompanying drawings. These terms are only used to facilitate the description of the disclosure herein and simplify the description, rather than indicating or implying that an apparatus or element referred to must have a specific orientation, be constructed and operated in a specific orientation, and therefore should not be understood as limiting the disclosure herein.

Furthermore, terms such as "first" and "second" are only used for descriptive purposes, and should not be understood as indicating or implying relative importance or implicitly specifying the number of the indicated technical features. Therefore, the features defined with "first" and "second" may explicitly or implicitly include at least one such feature. In the description of the disclosure herein, unless explicitly specified, "plurality of" means at least two, for example, two or three.

In the disclosure herein, unless otherwise clearly specified and defined, terms such as "installation" and "connection" should be understood in a broad sense. For example, the connection may be a fixed connection, a detachable connection, or an integral connection. The connection may be a mechanical connection. The connection may be a direct connection, an indirect connection through an intermediary, an internal communication between two elements, or an interaction relationship between two elements, unless otherwise clearly defined. Those of ordinary skill in the art may understand specific meanings of the foregoing terms in the disclosure herein in specific situations.

In the disclosure herein, unless otherwise explicitly specified and limited, a first feature being located "on" or "beneath" a second feature may be the first feature being in a direct contact with the second feature, or the first feature being in an indirect contact with the second feature through an intermediary.

It should be noted that when an element is referred to as being "arranged" on another element, the element may be directly located on the other element or an intervening element may alternatively be present. When being considered to be "connected" to another element, an element may be directly connected to another element, or an intervening element may be present. Further, when an element is considered to be "fixedly connected" to another element, the two elements may be fixed in a detachable connection manner or a non-detachable connection manner, such as sleeving, clamping, integral molding fixation, or welding. These connection manners may be realized in the traditional technology. Details are not described herein again.

The technical features of the foregoing examples may be combined in any manner. For the sake of brevity, not all possible combinations of the technical features in the foregoing examples have been described. However, any combination of these technical features should be considered within the scope of this specification, provided that no contradiction arises.

What is claimed is:

1. A hole-free curtain installation structure, comprising an upper beam bracket (1) and two installation frame assemblies (2), wherein the installation frame assemblies (2) are symmetrically arranged at both ends of the upper beam bracket (1), respectively; the installation frame assembly (2) comprises a housing (3) and a sliding frame component (4) slidably arranged on the housing (3) in a horizontal direction; the housing (3) is provided with an adjusting mechanism for adjusting a sliding position of the sliding frame component (4); the adjusting mechanism comprises a rotating member (5), an output gear (6), and a transmission component connected between the rotating member (5) and the output gear (6); the sliding frame component (4) is provided with a rack (401) meshing with the output gear (6); the rotating member (5) is capable of rotating in a circumferential direction thereof and sliding in an axial direction thereof; a first compression spring (7) is abutted between the output gear (6) and the rotating member (5); the rotating member (5) is provided with a positioning protrusion (501), and the housing (3) is provided with a positioning groove (301) corresponding to the positioning protrusion (501);

during installation, an external force drives the rotating member (5) to slide axially, so that the positioning protrusion (501) is separated from the positioning groove (301); the external force drives the rotating member (5) to rotate circumferentially, and the rotating member (5) drives the output gear (6) to rotate through the transmission component; the output gear (6) drives the sliding frame component (4) to slide toward an external wall (10) through the rack (401) until the sliding frame component (4) is abutted against the wall (10); and when the external force is released from the rotating member (5), the rotating member (5) slides and resets under an elastic force of the first compression spring (7), so that the positioning protrusion (501) is engaged and positioned with the positioning groove (301) to maintain an abutting force of the sliding frame component (4) against the wall (10).

2. The hole-free curtain installation structure according to claim 1, wherein the rack (401) extends in the horizontal direction, the sliding frame component (4) comprises a main frame body (41) and a telescopic frame (42) slidably arranged on the main frame body (41) in the horizontal direction, the telescopic frame (42) is arranged at the end of the main frame body (41) close to the wall (10), a second compression spring (43) is abutted between the telescopic frame (42) and the main frame body (41), and an anti-skid pad (44) is arranged on the side of the telescopic frame (42) away from the main frame body (41).

3. The hole-free curtain installation structure according to claim 2, wherein the telescopic frame (42) is provided with a buckle (421), the main frame body (41) is provided with a limit clamping groove (411) corresponding to the buckle (421), and the buckle (421) is slidably arranged in the limit clamping groove (411) in the horizontal direction; and the main frame body (41) is provided with a first abutting portion (412), and the telescopic frame (42) is provided with a second abutting portion (422) corresponding to the first abutting portion (412).

4. The hole-free curtain installation structure according to claim 1, wherein the transmission component comprises a transmission gear (8), the transmission gear (8) comprises a first transmission gear (81) and a second transmission gear (82) that are integrally formed, the first transmission gear (81) and the second transmission gear (82) are coaxially arranged, the rotating member (5) is integrally provided with a first gear portion (51) meshing with the first transmission gear (81), the output gear (6) is integrally provided with a second gear portion (61) meshing with the second transmission gear (82), and the output gear (6) and the second gear portion (61) are coaxially arranged.

5. The hole-free curtain installation structure according to claim 4, wherein the diameter of the first gear portion (51) is smaller than that of the first transmission gear (81), the diameter of the first transmission gear (81) is larger than that of the second transmission gear (82), the diameter of the second gear portion (61) is larger than that of the second transmission gear (82), and the diameter of the second gear portion (61) is larger than that of the output gear (6).

6. The hole-free curtain installation structure according to claim 1, wherein a plurality of positioning protrusions (501) are equally spaced in a ring, a plurality of positioning grooves (301) are equally spaced in a ring, and the number of positioning protrusions (501) is the same as that of positioning grooves (301).

7. The hole-free curtain installation structure according to claim 1, wherein both sides of the positioning protrusion (501) are provided with first guide slopes (5011), and both sides of a notch of the positioning groove (301) are provided with second guide slopes (3011) corresponding to the first guide slopes (5011).

8. The hole-free curtain installation structure according to claim 1, wherein the housing (3) is provided with an installation shaft (31), the output gear (6) is rotatably sleeved on the installation shaft (31), the first compression spring (7) is sleeved on the installation shaft (31), the sliding frame component (4) is provided with a sliding groove (402), and the installation shaft (31) is in sliding fit with the sliding groove (402).

9. The hole-free curtain installation structure according to claim 1, further comprising a rotating handle (9) for driving the rotating member (5) to rotate, wherein the rotating member (5) is provided with an insertion groove (502), the rotating handle (9) comprises a rotating shaft (91) and a handle (92) rotatably sleeved on the rotating shaft (91), the rotating shaft (91) is convexly provided with an arc-shaped positioning portion (911), the handle (92) is circumferentially provided with a plurality of positioning recesses (921) adapted to be movably engaged with the arc-shaped positioning portion (911), the rotating shaft (91) is provided with an insertion column (901) detachably inserted into the insertion groove (502), and the shape of the insertion column (901) is adapted to that of the insertion groove (502); when the insertion column (901) is inserted into the insertion groove (502), an external force pushes the handle (92) axially, and the handle (92) drives the rotating member (5) to slide axially through the rotating shaft (91), so that the positioning protrusion (501) is separated from the positioning groove (301); in this case, the external force rotates the handle (92) circumferentially to drive the rotating member (5) to rotate synchronously; and when the handle (92) is rotated, the rotating shaft (91) has resistance to the handle (92) in a circumferential direction, and when the resistance exceeds a preset value, the handle (92) idles relative to the rotating shaft (91).

10. A curtain, comprising the hole-free curtain installation structure according to claim 1.

11. A curtain, comprising the hole-free curtain installation structure according to claim 2.

12. A curtain, comprising the hole-free curtain installation structure according to claim 3.

13. A curtain, comprising the hole-free curtain installation structure according to claim 4.

14. A curtain, comprising the hole-free curtain installation structure according to claim 5.

15. A curtain, comprising the hole-free curtain installation structure according to claim 6.

16. A curtain, comprising the hole-free curtain installation structure according to claim 7.

17. A curtain, comprising the hole-free curtain installation structure according to claim 8.

18. A curtain, comprising the hole-free curtain installation structure according to claim 9.

* * * * *